United States Patent [19]

Lee

[11] 4,093,411
[45] June 6, 1978

[54] APPARATUS FOR APPLYING FOAMED MATERIAL IN-PLACE TO SURFACES

[76] Inventor: Jimmy D. Lee, 6821 Piccadilly, Houston, Tex. 77017

[21] Appl. No.: 644,563

[22] Filed: Dec. 29, 1975

[51] Int. Cl.² .............................................. B29D 27/04
[52] U.S. Cl. ...................... 425/64; 425/115; 425/224; 425/449; 425/817 C
[58] Field of Search .................. 425/4 C, 817 C, 447, 425/449, 470, 471, 60, 63, 64, 110, 113, 114, 115, 224; 249/20, 22, 65; 118/108, 323; 264/45.2, 45.4, 45.8, 45.9, 46.1, 46.5

[56] References Cited

U.S. PATENT DOCUMENTS

| | | | |
|---|---|---|---|
| 3,423,791 | 1/1969 | Smith et al. | 425/4 C |
| 3,548,453 | 12/1970 | Garis | 425/4 C |
| 3,702,274 | 11/1972 | Wooler | 425/4 C UX |
| 3,954,544 | 5/1976 | Hooker | 425/817 C X |

Primary Examiner—Francis S. Husar
Assistant Examiner—Mark Rosenbaum
Attorney, Agent, or Firm—Kenneth H. Johnson

[57] ABSTRACT

An apparatus for applying polymeric foam in-place to a surface comprising a movable framework which is spaced away from the surface and which forms a movable mold relative to the surface wherein a portion of the framework which is substantially parallel with the surface is comprised of a movable continuous belt located about a pressure plate being adjacent to the surface of the belt which forms a cover for the foamed surface. The continuous belt provides a non-blocking surface, i.e., one that does not hinder the movement of the framework as the foamed material rises and presses against the belt and pressure plate, since the continuous belt is rollably mounted.

10 Claims, 8 Drawing Figures

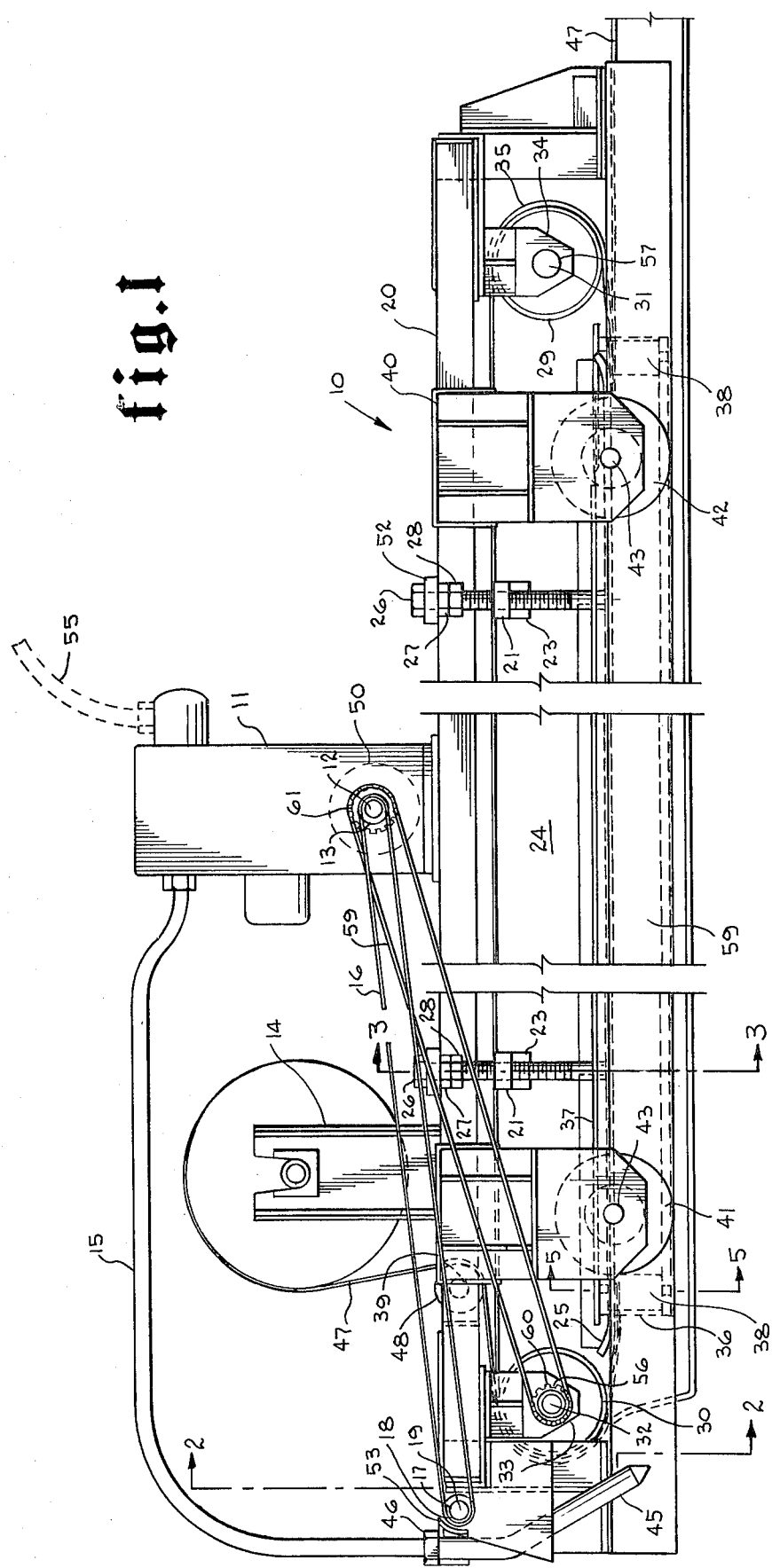

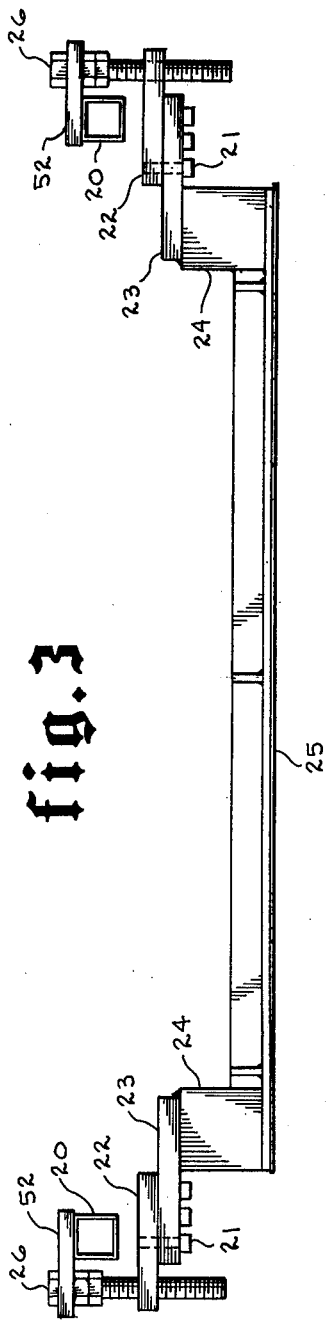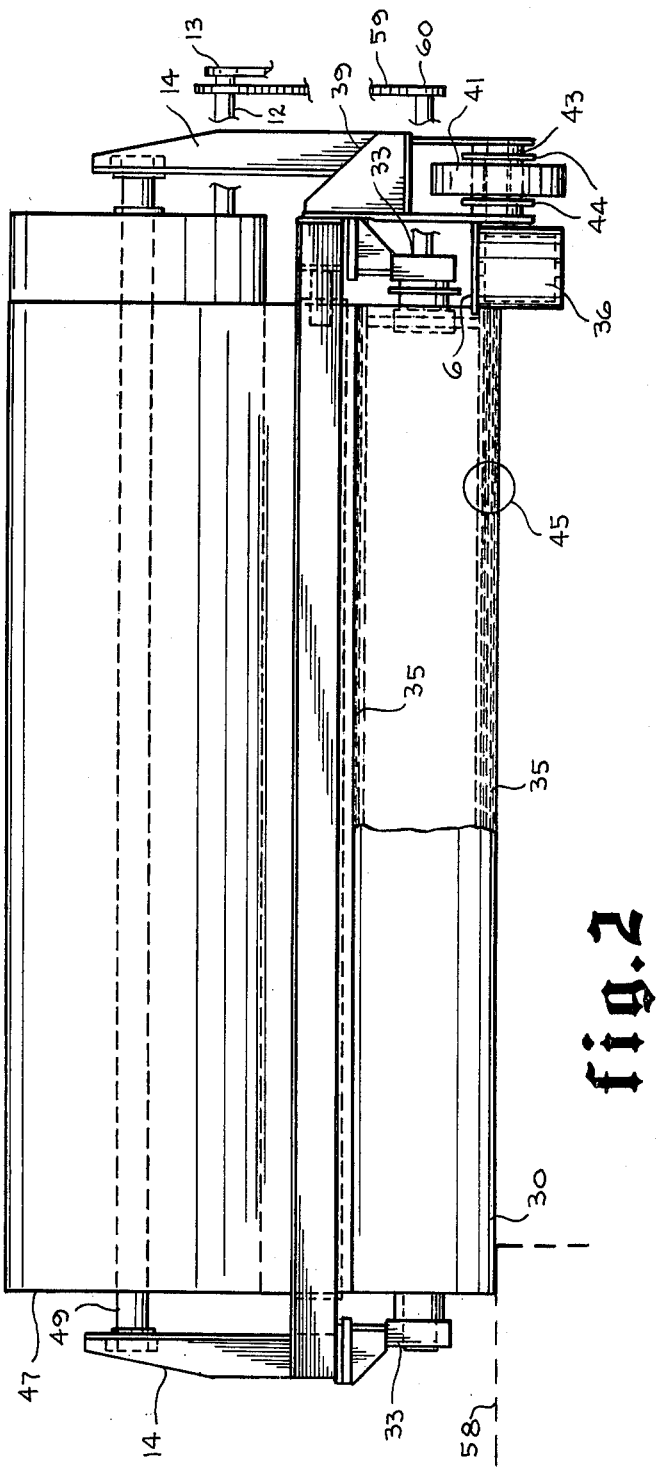

APPARATUS FOR APPLYING FOAMED MATERIAL IN-PLACE TO SURFACES

BACKGROUND OF THE INVENTION

The present invention relates to apparatus for use in foaming polymeric materials in-place, more particularly the present invention relates to an apparatus, which commprises a movable form for the application of foamed polymeric materials to either a vertical or other surface, such as roof.

Foamed-in-place materials, such as polyurethane are widely used principally for preparing in-place insulations. Currently, almost all commercial applications of such in-place foams is done by means of spraying the polymeric foam onto the surface to be coated with a hand held nozzle. Using prior technology, the foamed in-place material may be sprayed onto a substantially flat surface such as a non-pitched roof or, with care may be sprayed onto a pitched roof or vertical surface, provided the polymer selected has a very short curing time. Sprayed foams are widely used however, spraying requires a high degree skill by the operator. Less skilled operators may produce sprayed layers of uneven thickness. Where thick insulation, e.g., of three to 20 inches is required on a surface, multiple sprayed layers may be applied to the desired thickness. Skilled operators may be able to apply layers of three inch thickness, whereas less skilled operators may be able to spray layers only one or two inches thick. The thinner layers result is a more costly application because of the greater density of the surface (skin) of the foam. The ambient atmosphere into which the foam is sprayed, i.e., temperature, moisture, wind and the like, may adversely effect the foam quality. In multiple layer applications the condensation of moisture on the skin of lower layers can result in the destruction of foam cell structure and delamination of the layers.

Foamed-in-place materials may also be applied to surfaces which are vertical by means of removable forms. The removable form for one particular structure may be satisfactory, however very few structures are duplicates of other structures, and as a result each application using a foamed-in-place form must be custom job and can be very expensive. Frequently, the foamed material is injected between two wall surfaces, this however, results in uneven foam which is not inspectable because of the structures.

In those applications such as roofing where sprayed polymeric material is presently used to a large extent, the resulting surface is very frequently described as orange peel through popcorn, that is the surface exposed to the air has a rough, uniform texture, about the same texture as the outside of an orange through a popcorn appearance. Furthermore, it has been found that this prior art manner of application results in far more than the theoretical amount of foam being applied to the surface resulting in material waste. In theory, for example, polyurethane foams should produce approximately 6 board feet per pound of material, whereas in actual practice, only about 3 board feet per pound are achieved.

It is frequently necessary that the foams be coated with a material, in order to provide a completely waterproof surface and to protect them, for example from the exposure to the outside environment. In the prior practice, this requires a separate application wherein a coating material, such as sheet or sprayed solutions of butyl rubber, is bonded over a polyurethane foamed-in-place roofing or other installation.

One attempt to overcome the problems of the prior practice for application of foamed-in-place insulation, is described by E. H. Garis in U.S. Pat. No. 3,548,453. The Garis apparatus comprises a self contained unit which is movably mounted to a structure, such as a steel tank, which had spacer studs on which the movable apparatus rests and a traveling foam nozzle mounted on the apparatus so that foam is spread between the studs and on the tank while at the same time a roll of sheet metal is mounted in the apparatus to unroll and press against the foamed material forming a permanent outer surface and providing a form in which the foam expands. The nature of the foamed material is such that it will usually adhere to the surface of the tank and to the unrolled metal film applied on the outside surface over the foam, thus forming a securely held outer surface. This process was repeated around the tank until the space between the studs had been filled with foamed material and covered with the sheet metal. The Garis process is described as being useful either for vertical application or longitudinal application around the circumference of the tank. This procedure has been applied, however, some problems have developed with regard to the difference in the expansion properties of the foamed polymeric material and the tank studs as well as the metal and there has been some splitting of the seams. A particular disadvantage of this system, however, is the necessity of the sheet metal applied to the outer surface of the foamed material, which in effect is a part of the moveable form and which becomes a structural part of the tank. The use of any other materials than sheet metal, employing the Garis device would not provide the strength necessary to contain the foam which is continuing to rise within the form created by the fixed tank wall, the studs and the sheet metal applied over the studs adjacent to the foamed material.

Various other methods of forming "plastic" materials are shown in U.S. Pat. Nos. 2,522,116; 3,093,232; 3,497,579; 3,475,217; 3,555,131; 3,562,370; 3,691,003; and 3,715,417.

It is a feature of the present invention that a sheet material may be applied to the foam to provide an outer surface coating, but it need not be so applied. It is a particular feature that the coating material is not a structural element and is not necessary to contain the foam. It is a particular feature of the present invention that no studs or spacers as taught in the prior art are required. These features and the method by which they are achieved will be more fully understood from the following discussion including the description of specific embodiments of the invention as setforth in the drawings.

SUMMARY OF THE INVENTION

Briefly stated the present invention is an apparatus for applying a foamed polymeric material in-place to a surface, comprising a framework adapted to move adjacent to the surface to which the foam is to be applied, means associated with said framework to space the framework away from the surface, a non-blocking* surface attached to said framework and adapted to cover a portion of the foam material applied to the surface, foam dispensing means operably associated with said framework and positioned to deliver a foam to said surface adjacent to said containing means and the non-blocking surface. Additionally, means may be attached on only one side of said frame work for containing said foam.

*The term "non-blocking" as used herein refers to a property of a surface relative to a second surface, i.e., the tendency of two contacting surfaces to prevent movement along the plane of their contact. A non-blocking surface is a surface which is not hindered in movement when contacting a second surface, e.g., a foamed material.

According to the present invention, no spacers are required on the structure to which the foam is being applied. The foamed strip previously applied forms one side of the foaming section and the other side is closed off by a means on the framework. This side closing means may be a non-blocking surface similar to that forming the cover thereby containing the foam in the form. A sheet of flexible non-adhering material may extend between the non-blocking surface and the foam.

The non-blocking surface comprises a rolling surface. This surface in one embodiment of the present invention may be a continuous belt mounted on rollers or in another embodiment the non-blocking surface comprises a plurality of rollers. These embodiments and their relationship to the generic invention will become clear from the following discussions.

DRAWINGS

FIG. 1 is a side elevation in plan of one embodiment of the present apparatus.

FIG. 2 is a front elevation in plan of the embodiment of FIG. 1 taken on 2—2 of FIG. 1.

FIG. 3 is a cross sectional view taken on 3—3 of FIG. 1.

DETAILED DESCRIPTION OF THE INVENTION

Figure 4:
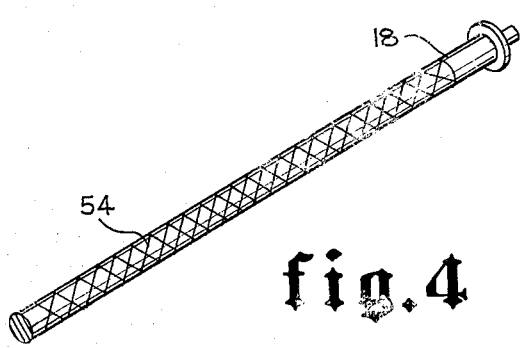
FIG. 4 is a detail of the nozzle traveller.

Many polymeric materials are produced as foams or are foamable, such as polyurethane; polymers and copolymers of ethylene, propylene, vinyl acetate, butene, isobutylene, butadiene; epoxy resin, silicone resin, polystyrene resin, urea-formaldehyde resin, phenol-formaldehyde resin, styrenebutadiene copolymer; butadiene-styrene-acrylonitrile copolymer and the like.

Polyurethane resins have been widely used for in-place foaming to produce insulating in structures. In the present invention, the foamable material, such as the polyurethane, is extruded from a dispersing means, such as a nozzle, or a mixing head. Conventional equipment of this type is mounted to the framework and usually provided with a means to move the dispersing means over the foaming area thereby evenly distributing the raw resin into the foaming area. Various foamable materials, including polyurethanes are well known in the art and may be used herein. Generally those same polymeric materials as are used for in-place foaming by prior manual spraying methods are suitable.

As noted hereinabove in theory one pound of polyurethane will produce about 6 board feet of foam, however, in actual practice only about three board feet per pound of foam is produced by the prior manual spraying techniques. The present apparatus and process approaches the theoretical board feet and produces well over the actual three board feet per pound previously achieved.

The present apparatus also reduces the surface area of the foam as much as 30% since it eliminates the orange peel or popcorn effect which results from the prior manual spraying techniques.

The present apparatus may be used on vertical, horizontal or surfaces between vertical and horizontal. Surfaces which are vertical or nearly so require means to hold the framework to the surface. This may comprise cables such as are currently employed on movable scaffolds whereby the framework is hauled up the surface by winches and held against the surface by tauntened cables; by a rigid frame on which the framework of the apparatus is movable or by counter weights.

Although the present apparatus may be used to traverse horizontally and thereby build layer on layer of foam, this is not a preferred method of operation. The polymeric resin which is being foamed tends to settle by gravity, hence the transverse strips of foam would be denser at the lower portion. In a vertical application wherein the apparatus moves vertically from the ground up the effect of gravity on the foam is substantially constant over the entire vertical application, hence the foam is very uniform.

The present invention may be better understood by reference to the drawings. FIG. 1 shows one embodiment of the present apparatus. This figure is a side elevation of the embodiment. The frame is designated as 10. It is comprised of an upper frame member 20 on which is mounted housing 11 which can serve a number of purposes, however, here it is shown as the location of motor 50, which is connected to shaft 12 and pulley 13 which drives a belt 16 which is connected to pulley or sprocket wheel 17 thereby rotating the pulley and the shaft 19 and the nozzle traveller 18, which will be described in more detail hereinafter. Sprocket wheel 61 is mounted on shaft 12 externally of pulley 13 and connected by chain drive 59 which is engaged with sprocket wheel 60, which is attached to axle 32 which drives roller 30 and propels the apparatus over the surface. The ratio between pulley 17 and sprocket wheel 17 is mechanically adjusted to obtain the desired rate of traverse of nozzle 45 relative to the forward progress of the apparatus. The motor 50 will preferably operate at an adjustable rate, e.g., by gears.

Referring now to FIG. 3 which is cross sectional view taken at 3—3 on FIG. 1, the relationship of this arrangement to the overall apparatus can be best seen. Flange 22 is attached by any means for example, rivets 21, to plate 23, which is in turn attached fixedly to pressure plate side member 24, bolts 26 are threadably engaged into flange 22, so that by rotating bolt 26, the flange 22 and the elements connecting to it including the pressure plate 25, which is connected to the side members 24 are lowered and raised as desired. In the present embodiment, the bolts 26 are held in place after it is selected by two nuts 27 and 28 threaded thereon which are locked against the flanges 52, which are connected to the upper frame member 20 and through which the bolts 26 pass.

Connected to the upper frame member 20 at both the front and rear are hangers 33 and 34, respectively, as shown in FIGS. 1 and 2. Seated into the hangers, which are located on both sides of the upper frame member 20, by means of axles 32 and 31 respectively are rollers 30 and 29, respectively. In this embodiment the rollers are fixedly attached to the axles 32 and 31, which axles are allowed to rotate in sockets 56 and 57, of hangers 33 and 34, respectively. However the axle 31 can just as well be fixedly mounted in the sockets and the roller 29 allowed to rotate thereabout with the usual bearings and lubricating provided in either arrangement.

Passing around both of the rollers 30 and 29 is a continuous belt or web 35, which may be made up of individual links or maybe a flexible material such as a reinforced neoprene rubber, which may be coated with polypropylene, polyethylene, polytetrafluoroethane or other suitable release agent. The continuous belt 35 passes below pressure plate 25 by the appropriate adjustment of the location of the pressure plate as noted hereinabove through adjustment of bolts 26, or by selection of size of the belt 35. Attached to the upper frame member 20 at the forward end of the frame 10 is rack 14 which is adapted to receive a roll of flexible material 47, such as polyethylene or a fluorocarbon film.

The sheet material 47 comes off of a roll which is rotatably mounted, for example on a rod 49 as shown in FIG. 2, and into contact with roller 48, which is mounted in the upper frame member and hence from there over roller 30 below the continuous belt 35 and out the back of the apparatus. Referring again to FIG. 2, the arrangement and location of the roll of flexible material 47 can be seen in regard to the front of the apparatus. The roll 47 extends beyond the rollers 30 and 29 and the flexible belt 35, so that the flexible materials will extend below the flexible continuous belt 36 and the side of the apparatus.

Figure 5:
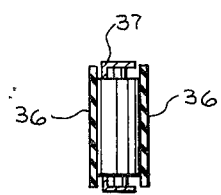
FIG. 5 is a detail of the side continuous belt along 5—5.
Figure 6:
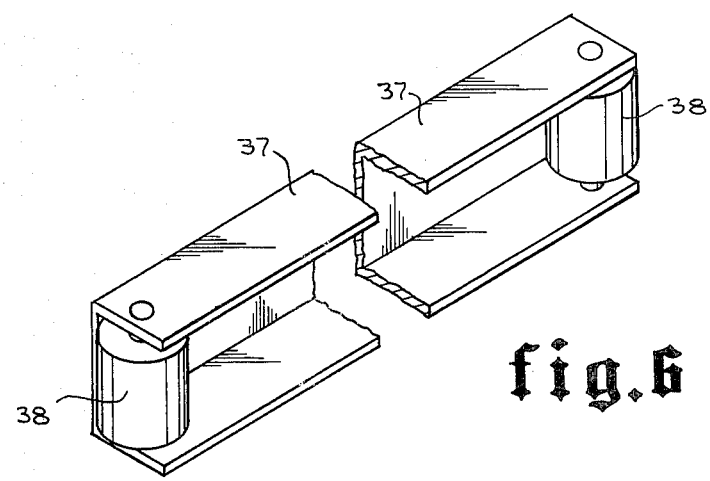
FIG. 6 is a detail of side plate 37.

Belt 36 is mounted adjacent to the continuous belt 35, thereby providing a continuous side belt. This may be more clearly seen by reference to FIG. 5 which shows the flexible continuous belt 36 substantially vertically mounted onto rollers 38, which are mounted in the side plate 37 so that the continuous belt 36 passes around said rollers over said side plate 37, thereby providing a rigid surface against which the foaming material may press the flexible film if present.

Looking further at FIG. 2 the wheel 41 is seen to be mounted on axle 43 and held in place by spacers 44. Note that in the drawing that there is a wheel provided only on one side of the apparatus. The other side of the apparatus is designed to ride on the previously foamed strip or surface 58 produced in the same manner as a strip would be produced according to the operation described below. It should be appreciated that in the very first application of a strip of foam, a means, such as a preformed block of material of the same type as the foamed material, i.e., such as polyurethane would be used to support the side of the apparatus not having a wheel. The foamed material will foam to and adhere to either the block of initial material used to support the apparatus or to the previously layed down foamed material 58.

The foam is applied to the surface by means of nozzle 45, which is attached to a guide, which is mounted into the grooves on the nozzle traveller 18.

The nozzle traveller 18 is shown in more detail in FIG. 4. The traveller 18 has a continuous thread 54, which describes a continuous pattern as the nozzle traveller 18 is rotated so that the nozzle travels continuously from one side of the traveller to the other, having reached one side and will proceed continuously along the thread to the other side and soforth. The traveller 18 is turned by means of the motor 50 previously described which is connected through belt 16 to the pulley 17 and shaft which is connected to the nozzle traveller. The nozzle is coupled by coupler 46 to flexible hose 15 which is connected to the housing 11. Alternately hose 15 can be connected directly to an external reservoir (not shown). In some embodiments the housing 11 may have a resin reservoir thereon, however, in the present embodiment there is provided an external reservoir (not shown) which is connected via line 55 to the housing hence into flexible hose 15, whereby the resin is stored in a central location which could be used to service several such devices and would be more convenient for mixing and adding ingredients thereto, since the present apparatus will be continually moving.

In operation it is contemplated that a sheet of some type of flexible material or a combination of flexible sheet materials will be employed in order to either reduce the extreme resistance which may occur in the absence of the sheet material by the foaming material binding against the continuous belts 35 and 36, or to provide a protective covering at the same time as the foamed material is laid down. When it is desired that the foamed material not be covered at the same time, then a non-adhering material such as a polytetrafluoroethylene film may be used over the entire roll 47, thereby as the film comes out it will prevent any adhering or resistance developing between the surfaces of the two continuous belts 35 and 36 which comprise the movable mold of the present apparatus, but will allow the foamed material to contact whatever surface is employed on the side not having the wheels, thereby bonding that surface, whether it is a preformed block of foamed material, previously foamed strip or surface, a strut or whatever and adhere thereto. After the foam is laid down, the polytetrafuoroethylene may be stripped therefrom with little difficulty. Other films which do not readily adhere to the particular foamed material may also be employed, for example silicone coated release materials. However, where it is desired to form a protective coating over a foamed material, such as a coating of butyl rubber adhered to the foam, such as a polyurethane foam, the roll of flexible material 47 would be comprised of a double roll wherein at least that portion of the material 47 which contracted the side pressure plate belt 36 would be releasable material so that the edge of the foamed polyurethane could be exposed by removing this material while the top surface would be covered by the protective material. The composite roll of flexible material may require some overlap of the adhering and non-adhering material, for example 3 to 6 inches, thereby there would be no unnecessary waste of the release sheet other than that required to cover substantially the side portion (adjacent to continuous belt 36) of the moving form of the present apparatus.

As shown in the present embodiment, means is provided on the apparatus of the present invention itself to provide mobility. Alternately, mobility can be provided by pulling the apparatus along the surface or operating to one side thereof. If the apparatus is small, for example, approximately 10 ft. × 4 ft. in the overall dimensions, it is possible to be pushed by hand. An external motor (not shown) could be located at the upper or far end of the strip which is being foamed and a cable attached to the apparatus would be wound about a wrench attached to a motor means, which could be easily moved along the upper end of the work surface and could be readily controlled by an operator at that point or at the apparatus.

The embodiment shown here is that of a high degree of sophistication, and it is not necessary, within the scope of the present invention to employ all of the refinements shown in these figures in order to obtain the advantages and features available as a result of this present invention. For example, it is not essential, although highly desirable that the flexible sheet of material 47 be employed with the present apparatus. In some embodiments, only the non-blocking surfaces on the pressure plate 25 and the containing member 36 would contact the foam. For example, polytetrafluoroethane belts may be employed, which materials have very low tendencies to adhere to some foamed materials. Furthermore, other release agents can be continuously applied, for example, by means not shown to the continuous belts, such as silicone release agents, which will prevent adhering of the belts to the foamed material.

Similarly it is not necessary, if the sheet material 47 is employed, to employ the entire roll so that the sheet of material contacts both the continuous belt of the pressure plate 35 and the continuous belt of the containing member 36. In some embodiments the flexible sheet will contact only the pressure plate 25 and the belt thereover. The advantage to be gained with the sheet material 47, is a reduction in the blocking forces which will naturally enure from the tacky foam material. The invention however is operable without the sheet material or with only a limited amount of sheet material, since the amount of tacky foamed material which would be contacting the containing member of the continuous belt 36 would be small and hence, any blocking effect will be minimized in regard to the overall operation of the apparatus.

It is also apparent that other arrangements than a single nozzle may be employed in order to apply the foamed material, such as a multi-nozzle head which may then not involve a traveller.

Figure 7:
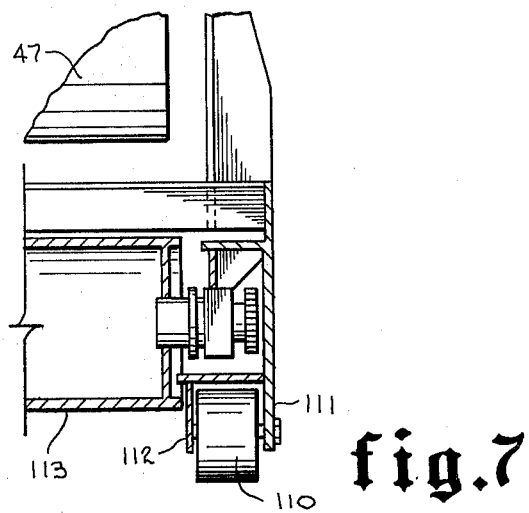
FIG. 7 is partial front elevation of an alternate embodiment of one aspect of the present invention.
Figure 8:
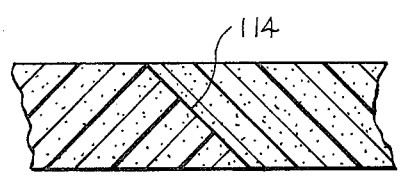
FIG. 8 is a cross sectional view of a foamed section.

Referring now to FIG. 7, a preferred embodiment is shown wherein the apparatus is the same as FIG. 1 except that the wheels 41 and 42 have been omitted, the function of the wheels, i.e., a roller means, is performed in this embodiment by a continuous flexible belt 110 located in the same location as the previous continuous belt 36. The continuous belt 110 is a continuous flexible material which runs about rollers (not shown) which are mounted into the plate 111 extending along the vertical side of the frame and to side plate 112, which extends from a point adjacent to the edge of roller 113 to a point above where the continuous belt or tread 110 contacts the surface to which the foam is being applied. The other elements of the apparatus are the same as previously shown. In this embodiment, the small area of the plate 112 which will contact the foam would not be sufficient to stay the progress of the apparatus along the surface, particularly when the plate 112 is coated with a non-adhering material such as polytetrafluoroethane. However, this adhering is of no movement at all when a flexible sheet of release material extends from the roll 47 and overlaps the continuous belt 110, since the foamed material will not come into contact with the plate 112. When the sheet of release material extends past plate 112 and below tread 110, the foamed material will have a slanted or unsquared surface as shown in FIG. 8, this however is of no consequence since the next foamed strip will be applied thereover and the slanted surface will provide a greater area over which the adjacent foam strip indicated by the dotted lines may adhere (note the release sheet is stripped off before the next foam strip is applied). The final strip applied in this fashion may be left with the slanted surface 114, as shown, but may just as easily be finished by hand spraying a level surface thereon in the conventional prior art manner.

Briefly to describe the operation of the embodiment shown in the figures, in one of the preferred embodiment, one would for example, employ the apparatus to coat a roof which had a slight pitch, for example 10°, by beginning at one side. The foam is polyurethane foam of approximately 6 board ft. per pound of polyurethane, with a protective coating of butyl rubber to be applied over the entire surface of the foamed roof. Along the edge of the roof or at any point where it is desired to begin a prefoamed block of polyurethane of the appropriate height, i.e., adjusted to the same height as the desired foam and the same height as the pressure plate 25 of the apparatus, is attached to the roof for example by adhesives or bolting means and the foam apparatus situated at the lower edge (appropriate scaffolding would be constructed at the lower edge to allow the apparatus to begin operation at the edge of the structural roof). A sheet of butyl rubber rolled into a roll 47 is located in the hanger 14, with the butyl rubber extending along the roll to a point adjacent to about three inches of the pressure plate roller 35 and extending beyond that would be a sheet of non-adhering release film also rolled onto roll 47. The combination sheet of material will extend back over the pressure plate 25. The foaming would begin at the edge of the roof by initiating the flow of foam through nozzle 45 and beginning the operation of the motor 50 to move the apparatus upward along the roof with the side of the frame opposite the wheels 41 or tread 110 resting on the preformed block 58 allowing the nozzle 45 to move transversely across the front of the apparatus as the apparatus progress forward along the roof, thereby applying a continuous strip of polyurethane material (resin) surface which will foam into contact with the continuous belt 35 of the pressure plate 25 and the continuous belt 36 of the containing member. Alternately the nozzle 45 can be adjusted to apply the resin to the continuous belt 35 or the sheet material 47 passing thereover, and be allowed to foam down to the surface being covered. In the initial run the continuous belt would completely overlap the preformed block, which would then waterproof and protect that element also. A suitable adhesive could be applied to that portion of the butyl rubber sheet overlapping element 58 as the initial foam section were being laid or separately by hand after the butyl rubber sheet has been laid. As with all areas of the foaming arts, a knowledge of the nature of the material being foamed is essential, hence, the speed with which the apparatus, which is a movable form, in effect is advanced along the roof, is adjusted along with the speed of the motor 50 so that the foamed material is substantially hardened to its final shape by the time the apparatus and the movable form pass away from that section of the foamed material. After the apparatus has completed the first strip, it is returned to the lower portion of the roof and the apparatus is seated onto the previously foamed section, again with an overlap of the butyl rubber sheet over the preceding foamed section. In actual practice the foamed polyurethane may creep out along the edge of the roll of the surface adjacent to the preformed section and thereby seal the butyl rubber over the overlapped section, or as before a suitable adhesive may be continuously applied (by means not shown) to the overlapped section or it may be subsequently hand applied after the second section is completed. This operation is completed sequentially in strips along the roof until the entire roof is covered with foamed polyurethane which is protected and sealed over by a butyl rubber sheet. The release sheet which has been played out along with the butyl rubber is stripped off before the next strip of foam is laid thereby exposing the previous foamed polyurethane to the newly foamed polyurethane, which does form a complete and tight adhesive seal.

A similar procedure would be employed for applying vertical foam. The apparatus is quite easily adapted to be connected into conventional vertical lifting equipment, such as ordinary fork lift equipment, and it is only necessary to provide adequate tension means to hold the apparatus tightly to the vertical surface in order to obtain an even and desirable in-place foam insulation.

The present apparatus and the various embodiments thereof as described, provide a great advantage to the foaming art, whereby substantially all of that in-place foam, which has been applied in the prior art to various surfaces by hand, may now be applied by the present apparatus. As noted hereinabove the hand application of in-place foams required a very high degree of skill. The present apparatus reduces the level of skill necessary for the operator, since the machine replaces the judgement of the individual operator in applying the foam, thereby providing a more economic means for achieving the same or superior results to the prior art. Moreover, since a foam of any thickness can be applied by this method, substantial savings over the layered hand aplication of in-place foam will be achieved.

I claim:

1. An apparatus for applying a foamed polymeric material in-place to a surface having an independent spacing element thereon comprising:
    a framework adapted to move adjacent to the surface to which the foam is to be applied,
    spacing means attached to said framework along only one side thereof for spacing said framework away from the surface to which said foam is to be applied, said framework being operatively associated with such an independent spacing element to slidably contact such an independent spacing element along the side of said framework opposite to said spacing means,
    a fixed pressure plate adjustably mounted in said framework, substantially parallel to the surface to which the foam is to be applied, and adapted to cover a portion of the foamed material applied to the surface, said pressure plate being within a continuous belt mounted to said framework and which is a rolling surface, and
    foam dispensing means, operably associated with one side of said framework and positioned to deliver a foamed material in proximity to the surface to which the foam is to be applied, and said pressure plate.

2. The apparatus according to claim 1 wherein said spacing means comprises rolling means.

3. The apparatus according to claim 2 comprising,
    containing means attached to said framework along one side, adjacent to said means for spacing and operably associated with said pressure plate for containing said foamed material.

4. The apparatus according to claim 1 comprising a means attached to said framework for dispensing a sheet of flexible material over said pressure plate, said sheet being disposed between said pressure plate and said foamed material.

5. The apparatus according to claim 3 comprising means attached to said framework to dispense a sheet of flexible material over said containing means between said containing means and said foamed material.

6. The apparatus according to claim 3 wherein said containing means comprises a continuous belt.

7. The apparatus according to claim 1 wherein said foam dispensing means comprises a transversly movable nozzle mounted to said framework.

8. The apparatus according to claim 1 wherein said pressure plate is vertically adjustable.

9. The apparatus according to claim 1 wherein said continuous belt is motor driven.

10. An apparatus for applying a foamed polymeric material in-place to a surface having an independent spacing element thereon comprising:
    a framework adapted to move linearly adjacent to the surface to which foam is to be applied,
    spacing means attached to said framework along only one side thereof for spacing said framework away from the surface to which foam is to be applied,
    roller means associated with said spacing means,
    a fixed pressure plate having a continuous belt thereabout and attached to and vertically adjustable in said framework, said pressure plate being disposed substantially parallel to the surface to which the foam is to be applied and adapted to cover a portion of the foamed material,
    containing means attached to said framework adjacent to said spacing means and said pressure plate, comprising a continuous belt for containing said foamed material,
    said framework being operatively associated with such an independent spacing element to slidable contact such an independent element along the side of said framework opposite to said spacing means, said element, pressure plate and containing means comprising a form, into which said foamed material expands,
    foam dispensing means, operably associated with one side of said framework and positioned to deliver a foamed material onto the surface to which the foam is to be applied adjacent to said element, pressure plate and containing means, and
    means on said framework for dispensing a flexible sheet of material adjacent to said pressure plate and between said pressure plate and said foamed material.

* * * * *